(12) United States Patent
Kuramochi et al.

(10) Patent No.: US 11,400,814 B2
(45) Date of Patent: Aug. 2, 2022

(54) DISPLAY CONTROL DEVICE, VEHICLE, AND DISPLAY CONTROL METHOD

(71) Applicant: HONDA MOTOR CO., LTD., Tokyo (JP)

(72) Inventors: Toshikatsu Kuramochi, Tokyo (JP); Junya Ono, Tokyo (JP); Hitomi Hamamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/201,370

(22) Filed: Mar. 15, 2021

(65) Prior Publication Data

US 2021/0291656 A1 Sep. 23, 2021

(30) Foreign Application Priority Data

Mar. 18, 2020 (JP) .............................. JP2020-047925

(51) Int. Cl.
*B60K 35/00* (2006.01)
*G09G 3/20* (2006.01)

(52) U.S. Cl.
CPC ........... *B60K 35/00* (2013.01); *G09G 3/2003* (2013.01); *B60K 2370/188* (2019.05); *B60K 2370/1868* (2019.05); *B60K 2370/797* (2019.05); *G09G 2320/0666* (2013.01); *G09G 2360/04* (2013.01); *G09G 2380/10* (2013.01)

(58) Field of Classification Search
CPC .............. B60K 35/00; B60K 2370/797; B60K 2370/188; B60K 2370/1868; G09G 3/2003; G09G 2320/0666; G09G 2360/04; G09G 2380/10
See application file for complete search history.

(56) References Cited

U.S. PATENT DOCUMENTS

| 5,757,359 A * | 5/1998 | Morimoto .............. G01C 21/36 345/156 |
| 9,956,898 B1 * | 5/2018 | Dellock ................. B60K 37/04 |
| 10,242,457 B1 * | 3/2019 | Sibley .................... G09G 3/003 |
| 10,699,488 B1 * | 6/2020 | Terrano ................. G06N 20/00 |
| 11,144,759 B1 * | 10/2021 | Hatfield ................ H04W 12/12 |
| 2006/0152931 A1 * | 7/2006 | Holman ............. G02B 27/0994 362/297 |
| 2014/0313225 A1 * | 10/2014 | Lee ..................... G06Q 30/0261 345/633 |
| 2014/0321698 A1 * | 10/2014 | Chao ........................ G06T 7/20 382/103 |

(Continued)

FOREIGN PATENT DOCUMENTS

| JP | 2014-202859 A | 10/2014 |
| JP | 2019-184634 A | 10/2019 |
| JP | 2020-024514 A | 2/2020 |

*Primary Examiner* — Christopher E Leiby
(74) *Attorney, Agent, or Firm* — Carrier Blackman & Associates, P.C.; Joseph P. Carrier; Jeffrey T. Gedeon

(57) ABSTRACT

A display control device includes: a traveling state judging unit configured to judge a traveling state of a vehicle; and a display control unit configured to control the display of content in a display area facing outward from the vehicle. The display control unit displays the content in achromatic colors in the display area while the traveling state judging unit judges that the vehicle is traveling, and displays the content in chromatic colors in the display area while the traveling state judging unit judges that the vehicle is standing still.

6 Claims, 6 Drawing Sheets

(56) References Cited

U.S. PATENT DOCUMENTS

| | | | |
|---|---|---|---|
| 2016/0240125 A1* | 8/2016 | Sridharan | G09G 5/06 |
| 2017/0210228 A1* | 7/2017 | Katayama | G01P 1/08 |
| 2017/0269362 A1* | 9/2017 | Yamasaki | G02B 27/0101 |
| 2018/0118099 A1* | 5/2018 | Kunii | B60K 35/00 |
| 2018/0186309 A1* | 7/2018 | Batten | B60Q 1/503 |
| 2018/0201207 A1* | 7/2018 | Kim | B60R 1/00 |
| 2020/0043052 A1* | 2/2020 | Takemura | G01C 21/3476 |
| 2020/0290513 A1* | 9/2020 | Karafin | G02B 27/0179 |
| 2020/0307379 A1* | 10/2020 | Balain | B60K 37/06 |
| 2020/0334907 A1* | 10/2020 | Bender | G06Q 10/06313 |
| 2021/0118341 A1* | 4/2021 | De Castro Turner | G09F 9/301 |
| 2021/0323471 A1* | 10/2021 | Urban | G06K 9/00791 |
| 2021/0396539 A1* | 12/2021 | Eyler | G01C 21/32 |

\* cited by examiner

DISPLAY CONTROL DEVICE, VEHICLE, AND DISPLAY CONTROL METHOD

CROSS-REFERENCE TO RELATED APPLICATION

This application is based upon and claims the benefit of priority from Japanese Patent Application No. 2020-047925 filed on Mar. 18, 2020, the contents of which are incorporated herein by reference.

BACKGROUND OF THE INVENTION

Field of the Invention

The present invention relates to a display control device, a vehicle, and a display control method.

Description of the Related Art

Japanese Laid-Open Patent Publication No. 2020-024514 discloses an information processing device that outputs advertisements through a display device provided on the outside of the body of a vehicle.

SUMMARY OF THE INVENTION

However, the information processing device of Japanese Laid-Open Patent Publication No. 2020-024514 cannot always provide advertisements in an appropriate manner.

An object of the present invention is to provide a display control device, a vehicle, and a display control method capable of displaying content in an appropriate manner.

A display control device according to an aspect of the present invention includes: a traveling state judging unit configured to judge a traveling state of a vehicle; and a display control unit configured to control the display of content in a display area facing outward from the vehicle. The display control unit displays the content in achromatic colors in the display area while the traveling state judging unit judges that the vehicle is traveling, and displays the content in chromatic colors in the display area while the traveling state judging unit judges that the vehicle is standing still.

A vehicle according to another aspect of the invention includes the display control device configured as described above.

A display control method according to still another aspect of the invention includes: judging a traveling state of a vehicle; and controlling display of content in a display area facing outward from the vehicle. In the controlling of the display, the content is displayed in achromatic colors in the display area while the vehicle is traveling, and the content is displayed in chromatic colors in the display area while the vehicle is standing still.

The present invention thus provides a display control device, a vehicle, and a display control method capable of displaying content in an appropriate manner.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The display control device, vehicle, and display control method according to the present invention will be described in detail below in connection with preferred embodiments while referring to the accompanying drawings.

Embodiments

Figure 1:
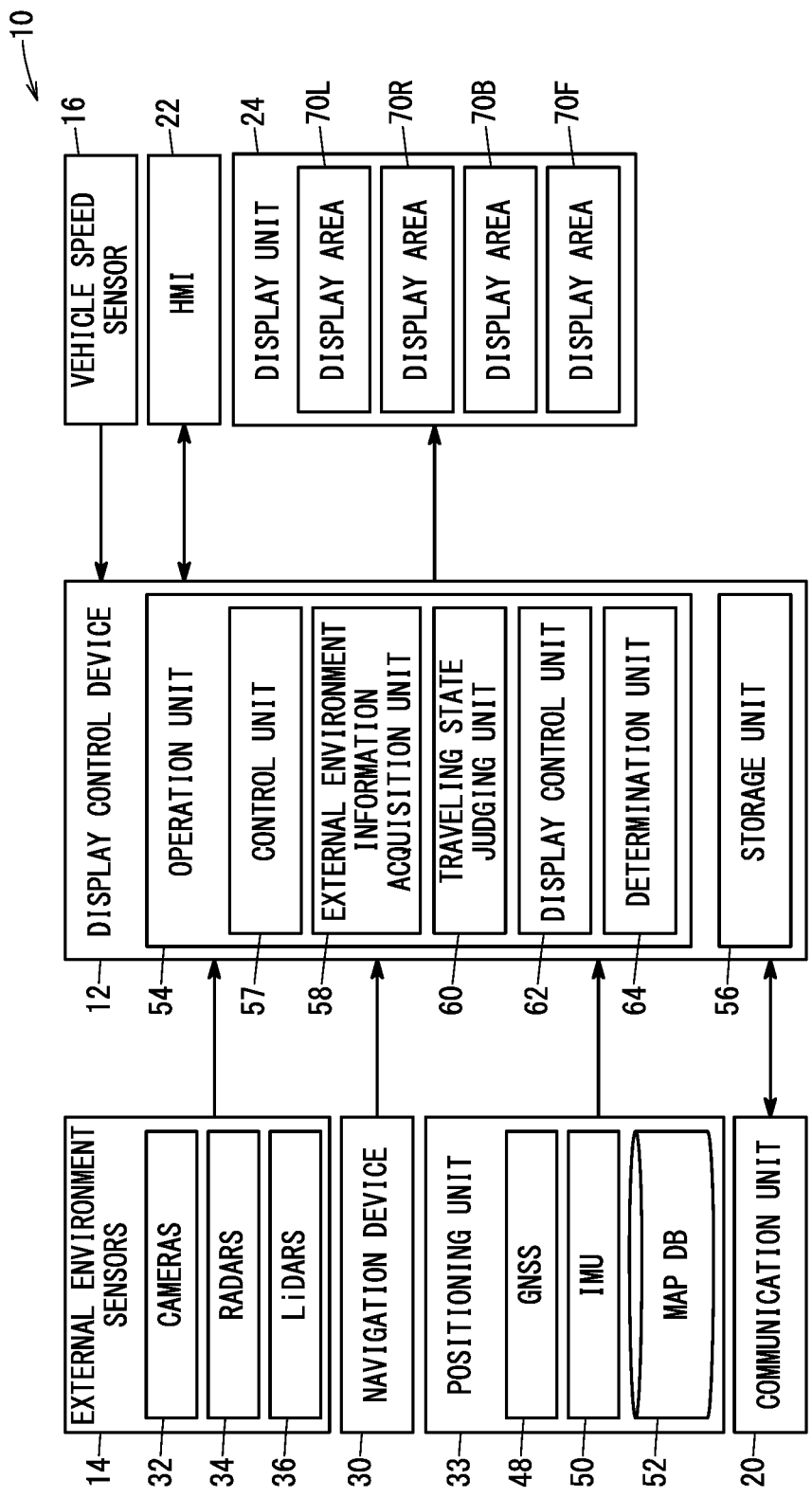
FIG. 1 is a block diagram illustrating a vehicle equipped with a display control device according to an embodiment.

The display control device, vehicle, and display control method according to an embodiment will be described referring to the drawings. FIG. 1 is a block diagram illustrating a vehicle that is equipped with the display control device according to the embodiment.

A vehicle (a user's vehicle) 10 is equipped with a display control device 12, i.e. a display control ECU (Electronic Control Unit). The vehicle 10 is further equipped with external environment sensors 14, a vehicle speed sensor 16, a communication unit 20, an HMI (Human Machine Interface) 22, a display unit 24, a navigation device 30, and a positioning unit 33. The vehicle 10 is equipped with other constituent components in addition to these constituent components, but they are not described herein.

The external environment sensors 14 acquire information indicating external environment conditions around the vehicle 10, i.e. external environment information. The external environment sensors 14 include a plurality of cameras 32 and a plurality of radars 34. The external environment sensors 14 further include a plurality of LiDARs (Light Detection And Ranging, Laser Imaging Detection And Ranging) 36.

Information captured by the cameras (image capturing devices) 32, i.e. camera information, is supplied from the cameras 32 to the display control device 12. The camera information includes photographic information etc. The camera information constitutes the external environment information together with radar information and LiDAR information which will be described later. FIG. 1 shows only a single camera 32, but in fact the vehicle 10 is equipped with a plurality of cameras 32.

Each radar 34 emits transmission waves to the outside of the vehicle 10 and receives the reflected waves that have been reflected off the detected objects back to it. The transmission waves can be electromagnetic waves, for example. The electromagnetic waves can be millimeter waves, for example. The radars 34 generate radar information (reflected wave signals) based on the reflected waves etc. The radars 34 provide the generated radar information to the display control device 12. FIG. 1 only shows a single radar 34, but in fact the vehicle 10 is equipped with a plurality of radars 34. The radars 34 are not limited to millimeter wave radars. For example, laser radars, ultrasonic sensors, and the like can be used as the radars 34.

Each LiDAR 36 successively emits laser light in all directions around the vehicle 10 and measures the three-dimensional positions of the points of reflection on the basis of the reflected waves, to thereby output information regarding the three-dimensional positions, i.e. three-dimensional information. The LiDARs 36 supply the three-dimensional information, or LiDAR information, to the display control device 12. FIG. 1 only shows a single LiDAR 36, but in fact the vehicle 10 is equipped with a plurality of LiDARs 36.

The vehicle speed sensor 16 can detect the speed of the vehicle 10, i.e. the vehicle speed. Information detected by the vehicle speed sensor 16, i.e. information indicating the vehicle speed, is supplied to the display control device 12.

The communication unit 20 performs wireless communications with external equipment (not shown). The external equipment may include an external server (not shown) and the like, for example.

The HMI 22 accepts operational inputs from a vehicle occupant and provides various information to the vehicle occupant visually, acoustically, or haptically. The HMI 22 may include a display and a speaker (neither of which is shown), for example.

The display unit 24 may be a liquid-crystal display unit, organic EL display unit, LED matrix unit, or the like, for example, but the display unit 24 is not limited to these examples. The display unit 24 may be formed of a projector unit. When the display unit 24 is formed of a projector unit, the projector unit is installed inside the vehicle 10 so as to project content onto windows of the vehicle 10. The display unit 24 includes display areas 70B, 70F, 70L, 70R that are directed to the outside of the vehicle 10, i.e., that face outward from the vehicle 10. The display areas will be labeled collectively with reference numeral 70 and individually with reference numerals 70B, 70F, 70L, 70R.

Figure 2:
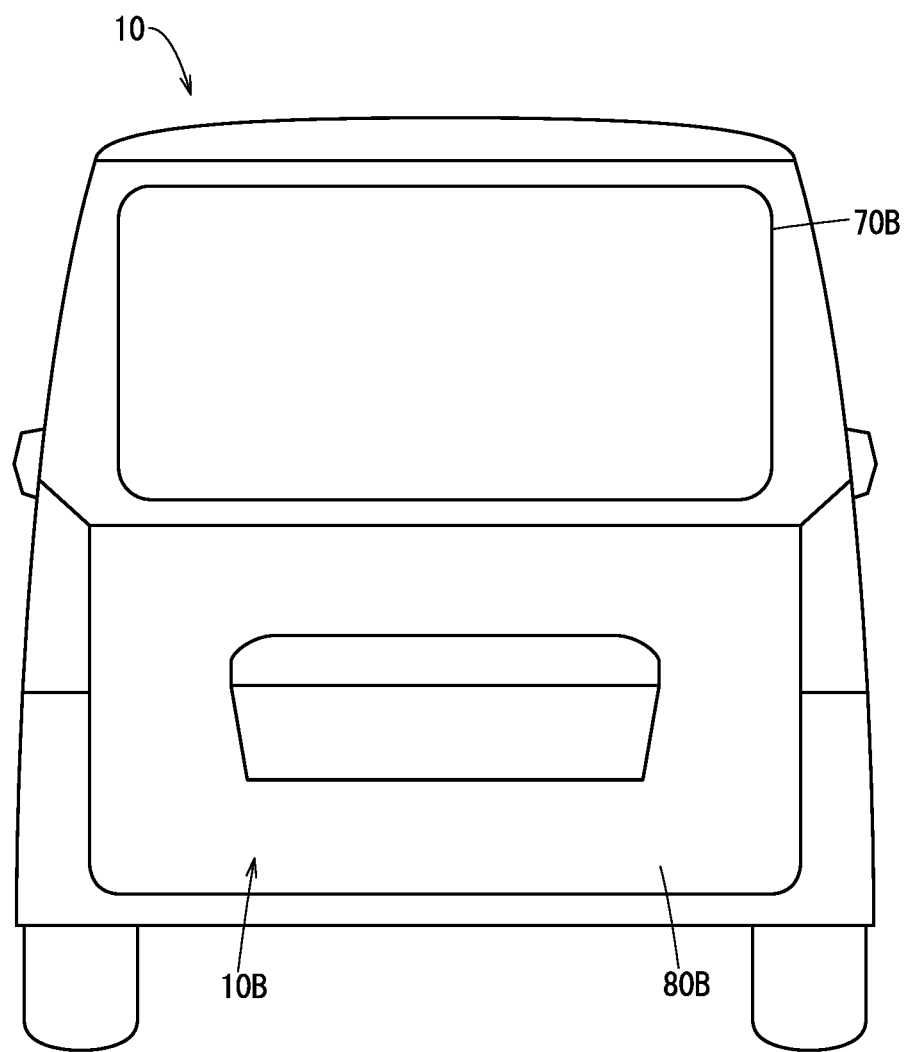
FIG. 2 is a diagram illustrating the vehicle.
Figure 3:
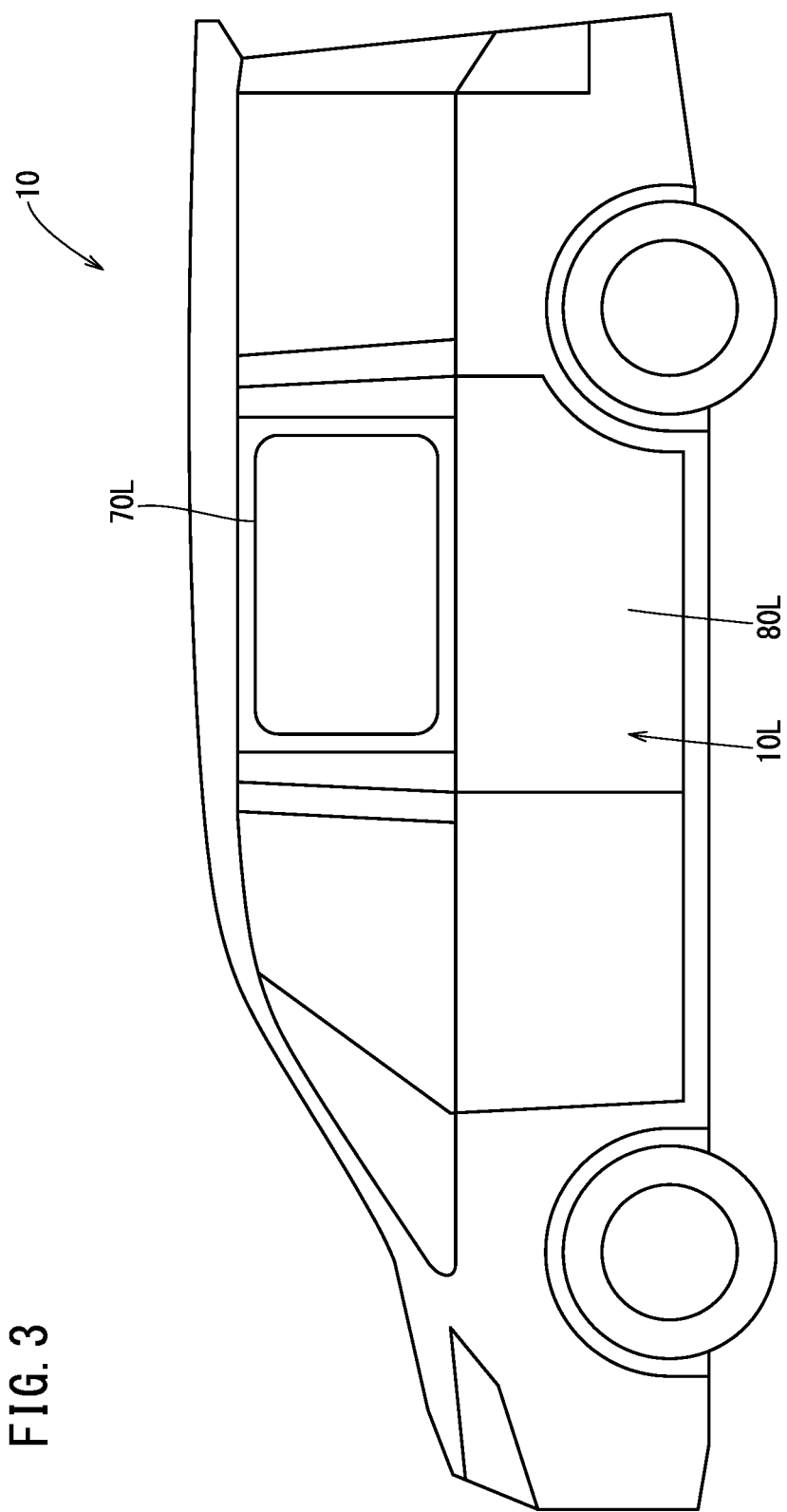
FIG. 3 is a diagram illustrating the vehicle.

FIGS. 2 and 3 are diagrams illustrating the vehicle 10. FIG. 2 shows a back 10B of the vehicle 10. FIG. 3 shows a left-hand side 10L of the vehicle 10. The back 10B of the vehicle 10 has a back door 80B, for example. The left-hand side 10L of the vehicle 10 has a sliding door 80L, for example. The right-hand side of the vehicle 10 (not shown) also has a sliding door (not shown), which will not be described herein. As shown in FIG. 2, the display area 70B is provided on the back 10B of the vehicle 10, or more specifically on the back door 80B. More specifically, the display area 70B is provided on the outside surface of the back door 80B. Since the display area 70B is provided on the back 10B of the vehicle 10, this display area 70B can be viewed from behind the vehicle 10. As shown in FIG. 3, the display area 70L is provided on the left-hand side 10L of the vehicle 10, or more specifically on the sliding door 80L. More specifically, the display area 70L is provided on the outside surface of the sliding door 80L. Since the display area 70L is provided on the left-hand side 10L of the vehicle 10, this display area 70L can face a sidewalk 94A described later (see FIG. 4). The display area 70R is provided on the right-hand side (not shown) of the vehicle 10, or more specifically on a sliding door (not shown). More specifically, the display area 70R is provided on the outside surface of the sliding door (not shown). The display area 70F may be provided on the front (not shown) of the vehicle 10.

The display areas 70 of the display unit 24 can display content, such as advertisements etc. Such content can be images, for example, but is not limited to images.

The navigation device 30 includes a GNSS (Global Navigation Satellite System) sensor (not shown). The navigation device 30 further includes an operation unit (not shown) and a storage unit (not shown). The GNSS sensor detects the current position of the vehicle 10. The operation unit reads map information corresponding to the current position detected by the GNSS sensor from a map database stored in the storage unit. Using the map information, the operation unit can determine the target route from the current position to the destination. The navigation device 30 can output the generated target route to the display control device 12. The navigation device 30 can supply the display control device 12 with positional information, route information, map information, etc., regarding the vehicle 10.

The positioning unit 33 includes a GNSS 48. The positioning unit 33 further includes an IMU (Inertial Measurement Unit) 50 and a map database (map DB) 52. The positioning unit 33 specifies the position of the vehicle 10 by using information obtained by the GNSS 48, information obtained by the IMU 50, and map information stored in the map database 52, as necessary. The positioning unit 33 can supply the display control device 12 with positional information about the user's vehicle as information indicating the position of the vehicle 10. The positioning unit 33 can further supply the display control device 12 with map information.

The display control device 12 includes an operation unit 54 and a storage unit 56. The operation unit 54 controls the entirety of the display control device 12. The operation unit 54 may be formed of one or more processors, for example. Such processors can be CPUs (Central Processing Units), for example. The operation unit 54 executes display control operation by controlling components based on programs stored in the storage unit 56.

The operation unit 54 includes a control unit 57, an external environment information acquisition unit 58, a traveling state judging unit 60, a display control unit 62, and a determination unit 64. The control unit 57, external environment information acquisition unit 58, traveling state judging unit 60, display control unit 62, and determination unit 64 can be realized by the operation unit 54 executing programs stored in the storage unit 56.

The storage unit 56 includes a volatile memory (not shown) and a nonvolatile memory (not shown). The volatile memory can be a RAM (Random Access Memory), for example. The nonvolatile memory can be a ROM (Read Only Memory), flash memory, etc., for example. External environment information, vehicle body behavior information, vehicle operation information, etc. can be stored in the volatile memory, for example. Programs, tables, maps, etc. can be stored in the nonvolatile memory, for example. Data relating to content, such as advertisements, can be stored in the nonvolatile memory, for example.

The control unit 57 controls the entirety of the display control device 12.

The external environment information acquisition unit 58 can acquire external environment information indicating the external environment conditions around the vehicle 10. The external environment information can be supplied from the external environment sensors 14 etc., for example. External environment information may be supplied from the navigation device 30, communication unit 20, and the like.

The traveling state judging unit 60 can judge the traveling state of the vehicle 10. The traveling state judging unit 60 may be configured to judge the traveling state of the vehicle 10 on the basis of information supplied from the vehicle speed sensor 16, i.e., information indicating the vehicle speed, for example, but the configuration thereof is not limited to this example. The traveling state judging unit 60 can judge whether the vehicle 10 is traveling or standing still (stopped), based on the traveling speed of the vehicle 10. "Standing still" includes not only conditions where the vehicle 10 is parked but also conditions where the vehicle 10 is waiting for the traffic lights to change, but it is not limited only to these conditions.

The display control unit 62 can control the display of content in the display areas 70 of the display unit 24. When the traveling state judging unit 60 judges that the vehicle 10 is traveling, the display control unit 62 can display content in achromatic colors in the display areas 70. When the traveling state judging unit 60 judges that the vehicle 10 is standing still or stopped, the display control unit 62 can display content in chromatic colors in the display areas 70.

In this embodiment, content is displayed in achromatic colors in the display areas 70 for the following reason. That is, the taillights, brake lights, direction indicator lights, etc. emit light in chromatic colors, such as red etc. Accordingly, if the display areas 70 display chromatic content, it may be mistaken for the lighting of taillights, brake lights, direction indicator lights, etc. That is, occupants (drivers, users) in other vehicles (not shown) may confuse chromatic content with the lighting of taillights, brake lights, direction indicator lights, etc. For this reason, in this embodiment, content is displayed in achromatic colors in the display areas 70 while the vehicle 10 is traveling.

In the embodiment, content is displayed in chromatic colors in the display areas 70 for the following reason. That is, while the vehicle 10 is not traveling, e.g., when the vehicle 10 is standing still, a serious problem does not arise even if chromatic content displayed in a display area 70 is mistaken for the lighting of taillights, brake lights, direction indicator lights, or the like. For this reason, in this embodiment, content is displayed in chromatic colors in the display areas 70 while the vehicle 10 is not traveling.

Figure 4:
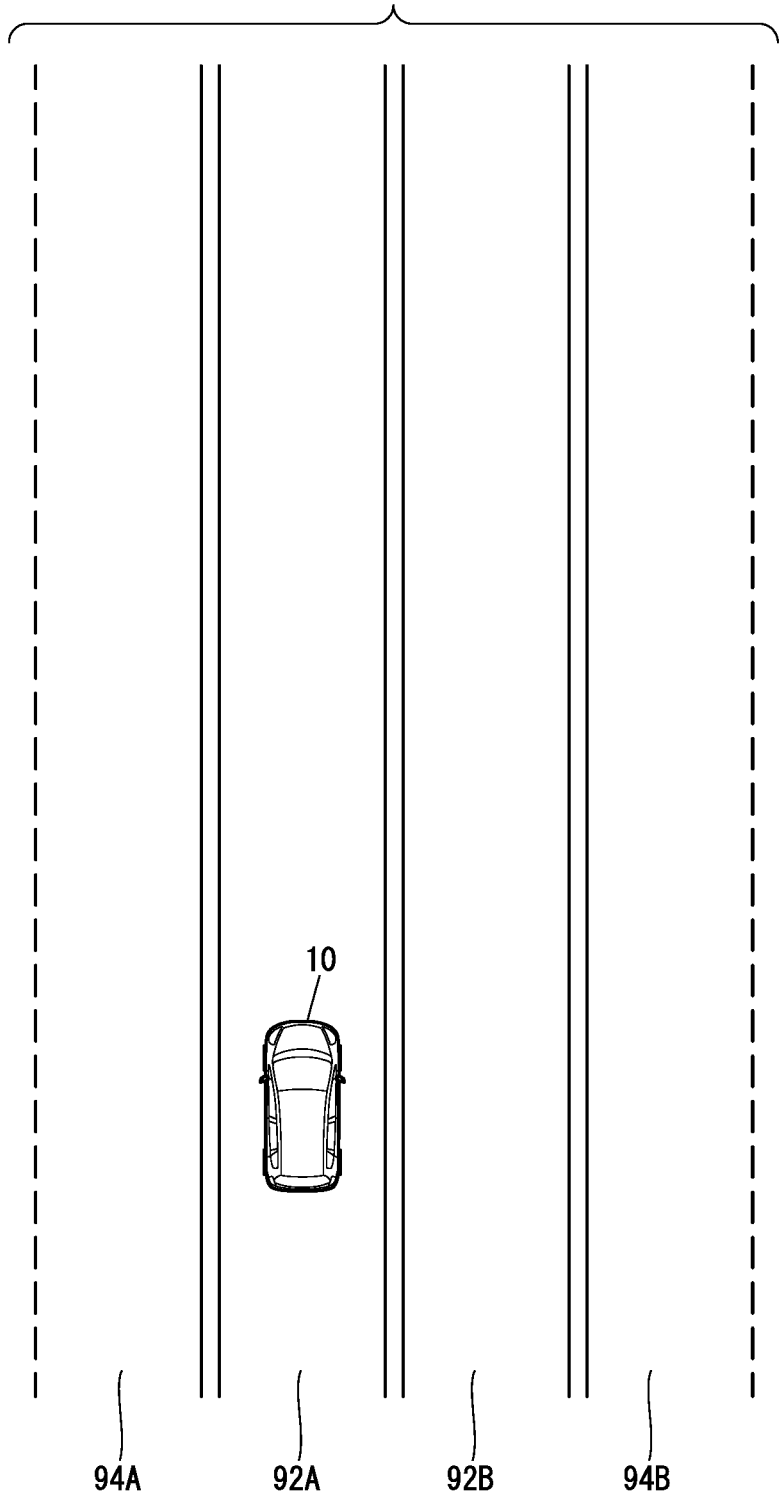
FIG. 4 is a diagram illustrating the vehicle located on a lane.

FIG. 4 is a diagram illustrating a situation where the vehicle is located on a lane. A lane 92A in which the vehicle 10 is traveling adjoins a lane 92B, i.e. the opposite lane. The lane 92A adjoins the sidewalk 94A. The lane 92B adjoins a sidewalk 94B. The sidewalks will be labeled collectively with reference numeral 94 and individually with reference numerals 94A, 94B. FIG. 4 illustrates a situation where the display area 70L (see FIG. 3) is facing the sidewalk 94A. The determination unit 64 can determine whether any of the display areas 70 is facing the sidewalk 94A, based on information acquired by the external environment information acquisition unit 58. More specifically, the determination unit 64 can determine which of the plurality of display areas 70 is facing the sidewalk 94A. The determination unit 64 can determine which of the display areas 70 is facing the sidewalk 94 on the basis of the external environment information supplied from the external environment sensors 14, for example, but the configuration thereof is not limited to this example. For instance, the determination unit 64 may be configured to determine which of the display areas 70 is facing the sidewalk 94 based on information supplied from the navigation device 30, information supplied from external equipment through the communication unit 20, and so forth.

While the traveling state judging unit 60 judges that the vehicle 10 is standing still or stopped, the display control unit 62 can display content in chromatic colors in one of the plurality of display areas 70 that is facing the sidewalk 94. On the other hand, in this case, the display control unit 62 can display content in achromatic colors in any of the plurality of display areas 70 that are not facing the sidewalk 94.

Content is displayed in chromatic colors in the display area 70 facing the sidewalk 94 for the following reason. That is, displaying content in chromatic colors is more likely to attract attention than displaying content in achromatic colors.

Content is displayed in achromatic colors in display areas 70 not facing the sidewalk 94 for the following reason. That is, for example, if chromatic content is displayed in the display area 70B that can be viewed from behind the vehicle 10 or in the display area 70F that can be viewed from ahead of the vehicle 10, then it may be mistaken by occupants in other vehicles for the lighting of taillights, brake lights, direction indicator lights, or the like. Accordingly, in order to prevent such misunderstanding, content can be displayed in achromatic colors in the display areas 70 not facing the sidewalk 94 even when the vehicle 10 is standing still.

Figure 5:
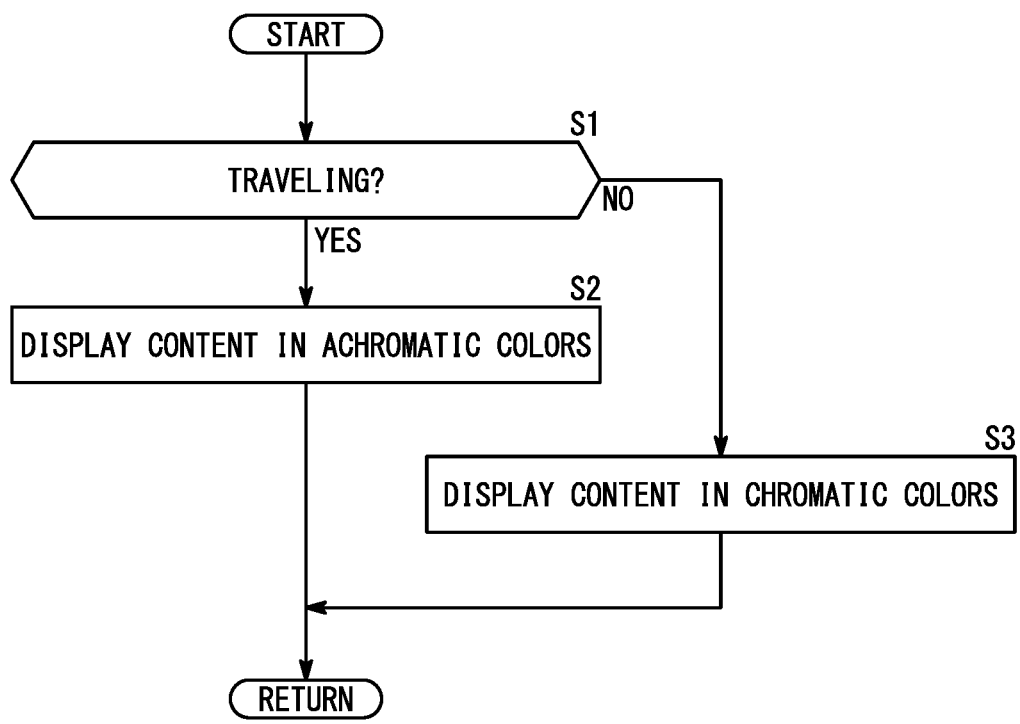
FIG. 5 is a flowchart showing an example of a process performed by the display control device of an embodiment.

FIG. 5 is a flowchart showing an example of a process performed by the display control device according to the embodiment.

In step S1, the traveling state judging unit 60 judges whether the vehicle 10 is traveling or not. If the vehicle 10 is traveling (YES in step S1), the process moves to step S2. If the vehicle 10 is not traveling (NO in step S1), the process moves to step S3.

In step S2, the display control unit 62 displays content in achromatic colors in the display areas 70.

In step S3, the display control unit 62 displays content in chromatic colors in the display areas 70. The process shown in FIG. 5 is executed in this way.

Figure 6:
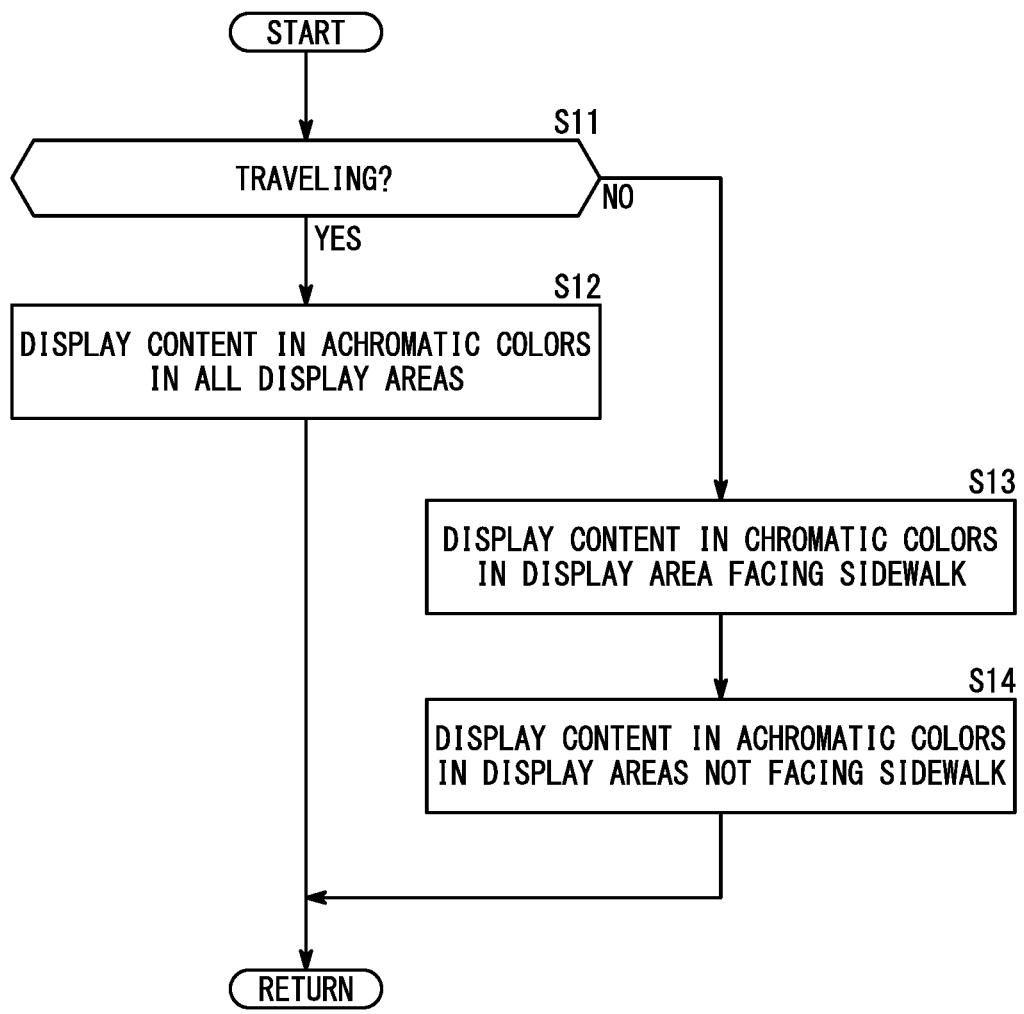
FIG. 6 is a flowchart showing an example of a process performed by the display control device of an embodiment.

FIG. 6 is a flowchart showing an example of a process performed by the display control device according to the embodiment. FIG. 6 shows an example in which content is displayed in chromatic colors in a display area 70 facing the sidewalk 94, while content is displayed in achromatic colors in the display areas 70 not facing the sidewalk 94.

In step S11, the traveling state judging unit 60 judges whether the vehicle 10 is traveling or not. If the vehicle 10 is traveling (YES in step S11), the process moves to step S12. If the vehicle 10 is not traveling, or if, for example, the vehicle 10 is standing still (NO in step S11), the process moves to step S13.

In step S12, the display control unit 62 displays content in achromatic colors in all of the plurality of display areas 70.

In step S13, the display control unit 62 displays content in chromatic colors in one of the plurality of display areas 70 that is facing the sidewalk 94. After this, the process moves to step S14.

In step S14, the display control unit 62 displays content in achromatic colors in the remaining ones of the plurality of display areas 70 that are not facing the sidewalk 94. The process shown in FIG. 6 is executed in this way.

In this way, in this embodiment, content is displayed in achromatic colors in the display areas 70 while the vehicle 10 is traveling, and content is displayed in chromatic colors in display area(s) 70 while the vehicle 10 is standing still. Thus, the embodiment prevents occupants in other vehicles from mistaking the display for the lighting of taillights, brake lights, direction indicator lights, or the like. That is, the embodiment provides the display control device 12 that can display content in an appropriate manner.

While preferred embodiments of the present invention have been described above, the invention is not limited to the embodiments but can be modified in various manners without departing from the essence and gist of the invention.

For example, at least one of the switching operations from achromatic colors to chromatic colors, and from chromatic colors to achromatic colors, may be conducted in stages according to the vehicle speed, or may be conducted in stages according to the acceleration of the vehicle 10.

Further, at least one of the switching operations from achromatic colors to chromatic colors, and from chromatic colors to achromatic colors, may be conducted according to change in the force of pressing the brake pedal, i.e., according to change in brake pressure. Further, at least one of the switching operations from achromatic colors to chromatic colors, and from chromatic colors to achromatic colors, may be conducted according to the position of the gear shift.

The embodiments described above can be summarized as follows.

A display control device (12) includes: a traveling state judging unit (60) configured to judge a traveling state of a vehicle (10); and a display control unit (62) configured to control the display of content in a display area (70B, 70F, 70L, 70R) facing outward from the vehicle. The display control unit displays the content in achromatic colors in the display area while the traveling state judging unit judges that the vehicle is traveling, and displays the content in chromatic colors in the display area while the traveling state judging unit judges that the vehicle is standing still. This configuration can display content in chromatic colors in the display area so that the content can attract attention. Further, this configuration can display content in achromatic colors in the display area while the vehicle is traveling so as to prevent occupants in other vehicles from mistaking the display for the lighting of taillights, brake lights, direction indicator lights, or the like. That is, this configuration provides a display control device capable of displaying content in an appropriate manner.

The vehicle may include a plurality of the display areas, and while the traveling state judging unit judges that the vehicle is standing still, the display control unit may display the content in chromatic colors in the display area (70L, 70R) that faces a sidewalk (94) among the plurality of display areas, and display the content in achromatic colors in the display area (70B, 70F) that does not face the sidewalk among the plurality of display areas. This configuration can display content in chromatic colors in a display area that is facing a sidewalk so that the content can easily attract attention from pedestrians etc. on the sidewalk.

The traveling state judging unit may judge whether the vehicle is traveling or standing still based on a traveling speed of the vehicle.

A vehicle is equipped with the display control device configured as described above.

A display control method includes: a traveling state judging step (S1) of judging a traveling state of a vehicle; and a display control step (S2, S3) of controlling display of content in a display area facing outward from the vehicle. In the display control step, the content is displayed in achromatic colors in the display area while the vehicle is traveling (S2), and the content is displayed in chromatic colors in the display area while the vehicle is standing still (S3).

The vehicle may include a plurality of the display areas, and, in the display control step, while the vehicle is standing still, the content may be displayed in chromatic colors in the display area that faces a sidewalk among the plurality of display areas (S13), and the content may be displayed in achromatic colors in the display area that does not face the sidewalk among the plurality of display areas (S14).

What is claimed is:

1. A display control device comprising:
    a traveling state judging unit configured to judge a traveling state of a vehicle; and
    a display control unit configured to control display of content in a display area facing outward from the vehicle,
    wherein the content that is displayed in the display area is viewed from an outside of the vehicle,
    wherein the display area is provided on an outside surface of the vehicle, and
    wherein the display control unit displays the content in achromatic colors in the display area while the traveling state judging unit judges that the vehicle is traveling, and displays the content in chromatic colors in the display area while the traveling state judging unit judges that the vehicle is standing still.

2. The display control device according to claim 1, wherein
    the vehicle includes a plurality of the display areas, and
    while the traveling state judging unit judges that the vehicle is standing still, the display control unit displays the content in chromatic colors in the display area that faces a sidewalk among the plurality of display areas, and displays the content in achromatic colors in the display area that does not face the sidewalk among the plurality of display areas.

3. The display control device according to claim 1, wherein the traveling state judging unit judges whether the vehicle is traveling or standing still based on a traveling speed of the vehicle.

4. A vehicle comprising a display control device,
    the display control device comprising:
    a traveling state judging unit configured to judge a traveling state of a vehicle; and
    a display control unit configured to control display of content in a display area facing outward from the vehicle,
    wherein the content that is displayed in the display area is viewed from an outside of the vehicle,
    wherein the display area is provided on an outside surface of the vehicle, and
    wherein the display control unit displays the content in achromatic colors in the display area while the traveling state judging unit judges that the vehicle is traveling, and displays the content in chromatic colors in the display area while the traveling state judging unit judges that the vehicle is standing still.

5. A display control method comprising:
    judging a traveling state of a vehicle; and
    controlling display of content in a display area provided on an outside surface of the vehicle and facing outward from the vehicle,
    wherein the content that is displayed in the display area is viewed from an outside of the vehicle, and
    wherein, in the controlling of the display, the content is displayed in achromatic colors in the display area while the vehicle is traveling, and the content is displayed in chromatic colors in the display area while the vehicle is standing still.

6. The display control method according to claim 5, wherein
    the vehicle includes a plurality of the display areas, and
    in the controlling of the display, while the vehicle is standing still, the content is displayed in chromatic colors in the display area that faces a sidewalk among the plurality of display areas, and the content is displayed in achromatic colors in the display area that does not face the sidewalk among the plurality of display areas.

* * * * *